United States Patent [19]

Kroll et al.

[11] Patent Number: 4,714,121
[45] Date of Patent: Dec. 22, 1987

[54] WHEEL SCALE ASSEMBLY

[76] Inventors: William P. Kroll, 2382 Pioneer Trail, Medina, Minn. 55340; Robert E. K. Kroll, 300 Shelard Pkwy., St. Louis Park, Minn. 55426; Mark W. Kroll, 13011 Brenwood Trail, Minnetonka, Minn. 55343; Karl J. F. Kroll, 5217 W. Mill Rd., Minnetonka, Minn. 55345

[21] Appl. No.: 10,324

[22] Filed: Feb. 3, 1987

[51] Int. Cl.⁴ .................... G01G 19/02; G01G 23/14; G01G 21/24
[52] U.S. Cl. .................................. 177/134; 177/164; 177/255
[58] Field of Search ........................ 177/134, 164, 255

[56] References Cited

U.S. PATENT DOCUMENTS

| | | | |
|---|---|---|---|
| 3,949,822 | 4/1976 | English et al. | 177/126 |
| 4,078,624 | 3/1978 | Bradley | 177/134 X |
| 4,203,497 | 5/1980 | Harris et al. | 177/134 |
| 4,261,428 | 4/1981 | Bradley | 177/208 |
| 4,281,728 | 8/1981 | Dickason et al. | 177/134 |
| 4,411,327 | 10/1983 | Lockery et al. | 177/211 |
| 4,506,746 | 3/1985 | Lockery | 177/211 |
| 4,560,017 | 12/1985 | Hood | 177/211 |
| 4,581,948 | 4/1986 | Reichow | 73/862.65 |

OTHER PUBLICATIONS

1979; Measurement Systems, International; Bantam Electronic, Portable Weighing System; Product brochure.

1984; Intercomp Co.; Wheel Load Scale; Product brochure.

1985; Intercomp Co.; PT300 Wheel Load Scale; Product brochure.

Primary Examiner—George H. Miller, Jr.
Attorney, Agent, or Firm—Anthony G. Eggink

[57] ABSTRACT

The invention provides a portable wheel scale assembly which comprises a lightweight, low profile housing structure having an interiorly disposed opening with a bottom surface. The housing structure has opposing parallel bearing surfaces therein and at least one load cell assembly with strain gauges. The load cell assembly further has opposing bearings for engaging the bearing surfaces in the housing and it is constructed and arranged to directly receive a load force at a predetermined area. A load cell retaining structure having vertically movable flexible members is provided for restraining the lateral movement of the load cell within the wheel scale housing and for placing a minimum preload force on the load cell. The load cell retaining structure is further constructed and arranged to have opposing rigid securement members to restrain the movement of the load cell bearings on the bearing surfaces within the scale housing. The wheel platform member of the scale assembly communicates with both the load cell assembly and the vertically movable flexible members of the load cell retaining structure and it further cooperates with the load cell assembly to form a structural component of the scale assembly.

20 Claims, 8 Drawing Figures

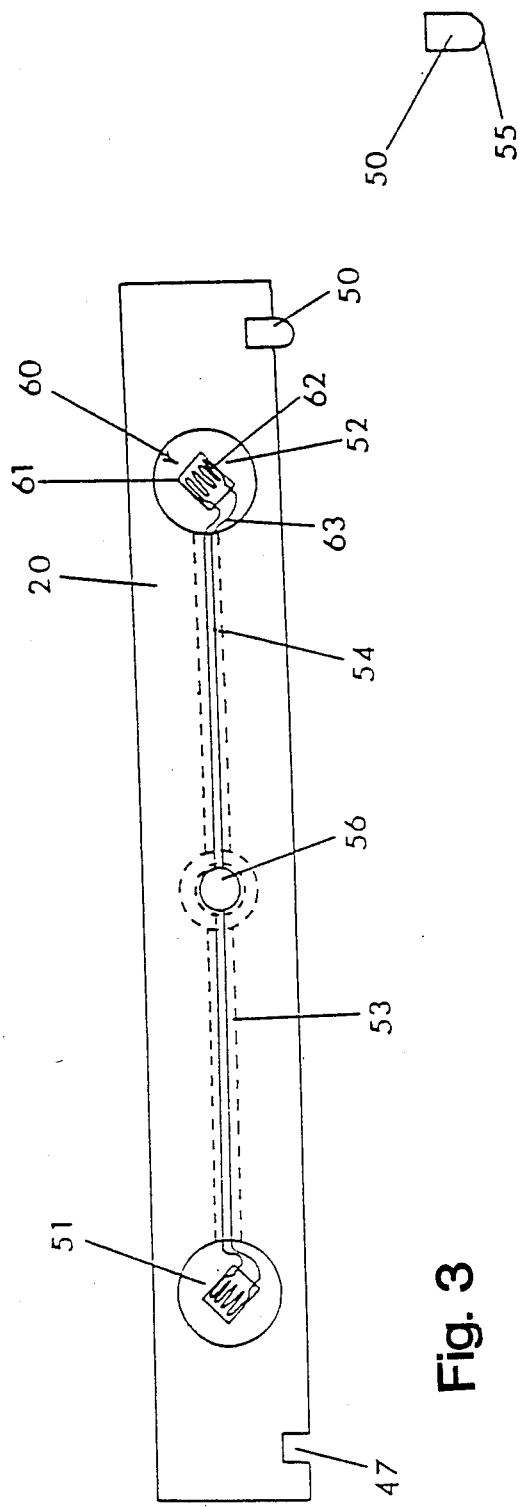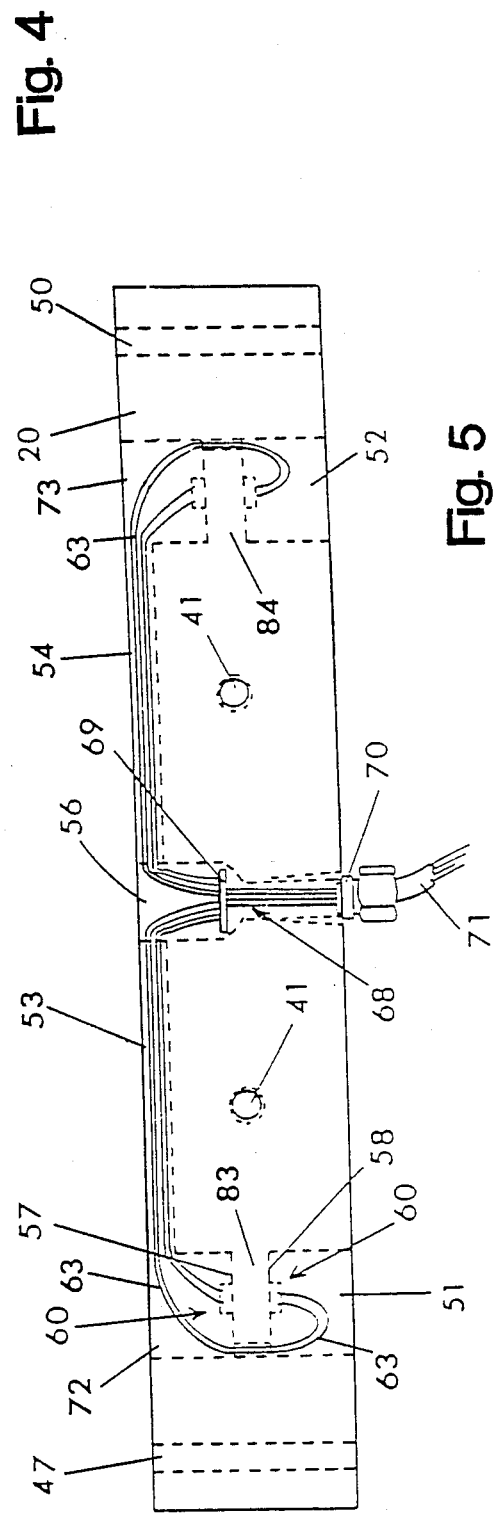

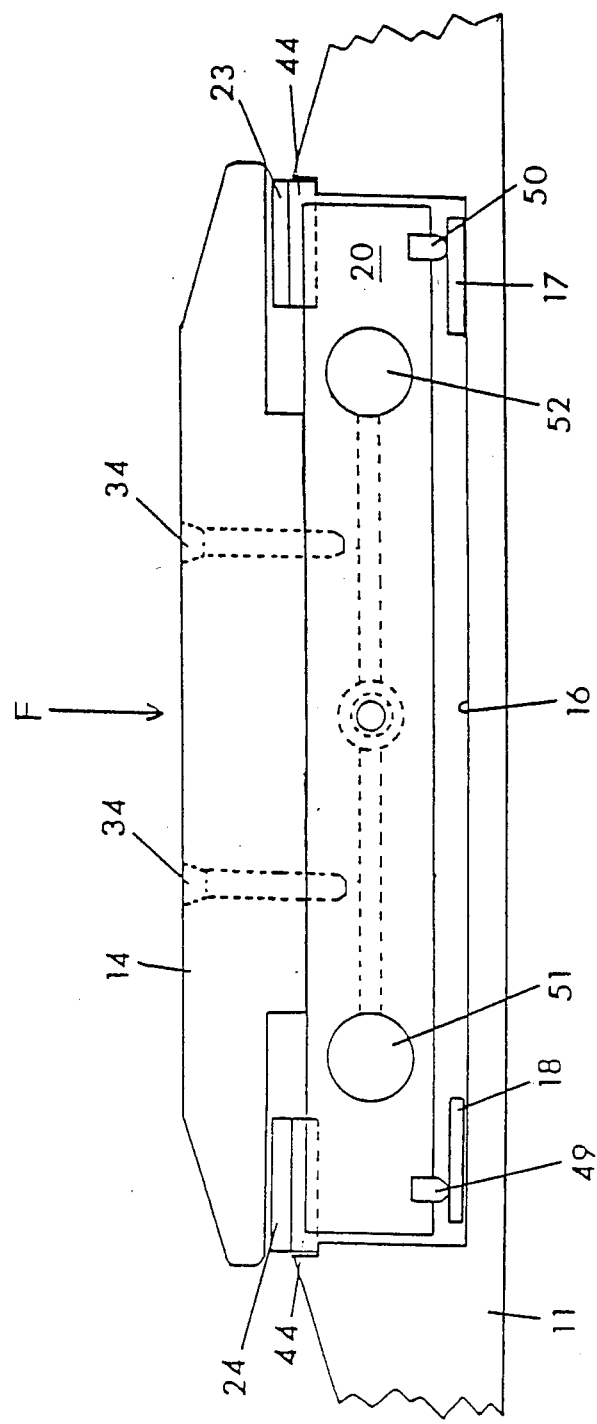

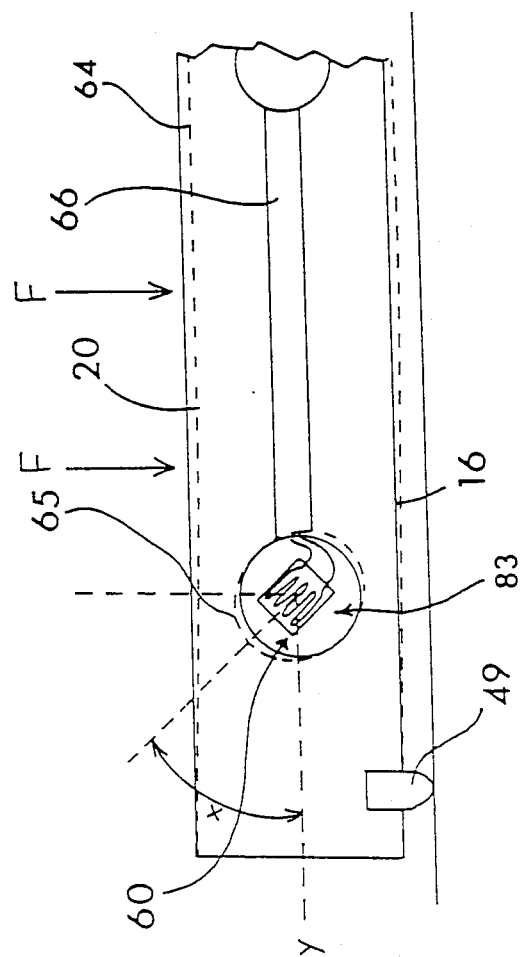

WHEEL SCALE ASSEMBLY

BACKGROUND OF THE INVENTION

This invention relates to wheel scale assemblies for weighing vehicles. Particularly, this invention relates to improved portable electronic wheel scales having load cell assemblies and cooperating load cell retaining structures to provide lightweight, low profile and accurate weighing scales.

A co-pending U.S. Patent Application entitled, "Load Cell Assembly", by Kroll et al has also been filed. That application further describes and claims improved load cell assemblies.

Wheel scales or platform scales are commonly used to measure axle weight loads of vehicles, such as trucks. And, although some platform scale devices are designed to accomodate the multiple wheels of dual tandem rear axle assemblies of commercial trucks, most wheel scale devices have a single platform to measure the load from single or dual wheels.

In use, a pair of wheel scales are spaced apart and the vehicle is driven onto the scale platforms one axle at a time. Each axle weight load is recorded and the summation of axle weights yields the gross weight of the vehicle.

Wheel scales utilizing load cells for weighing axle loads of motor vehicles are known in the weighing art. Additionally, wheel scales which utilize strain gauge sensors fixed to deflectable load cells are known. However, the specific configuration of the load cells utilized in prior art scales, the placement of the load cells in the housing structures of these scales, and the cooperation of the active and inactive elements of these prior art wheel scale devices often yield complex and bulky wheel scales which are inaccurate and unrepeatable under many conditions of use.

For example, prior art wheel scale devices have been proposed and manufactured to use various types of load cell configuratins for the purpose of yielding a lightweight, low profile and accurate portable wheel scale. Additionally, various wheel scale structures have been proposed and manufactured wherein these load cell configurations have been utilized with varying cooperative elements. Unfortunately, these prior art wheel scale structures have invariably resulted in devices that are not only difficult to transport and utilize and which are easily susceptible to damage, but which have required precise load placements onto the scale platforms to achieve any scale accuracy and repeatability.

Although load cell assemblies are usable in a variety of vehicle scale devices, there are specific requirements and difficulties associated with their use in portable wheel scales used by law enforcement officers, for example. Such portable wheel scales must be unitary, lightweight and rugged assemblies able to withstand the lateral forces resulting from the braking and skidding of truck tires.

Additionally, such portable wheel scales are preferably usable on a variety of road surfaces or terrains, should have low or thin profiles to prevent weighing inaccuracies caused by load shifts and are preferably accurate and reliable irrespective of the precise wheel placement of a vehicle onto the platform structures. The load cell assemblies of this invention in conjunction and cooperation with the scale housing structure and load cell retaining structure provide such a reliable and accurate portable wheel scale.

Many types of load cell assemblies have been used or proposed in conjunction with weighing scales as well as portable wheel scales. And, although ideally a freely floating load cell assembly is preferred for accuracy in weighing, it is also necessary to restrain the movement of the load cell itself for proper usage. This is particularly important in portable scales. Consequently, a variety of restraining mechanisms have been proposed to maintain the proper placement of the load cells within the confines of their respective wheel scale body structures. However, the use of these load cell fastening or restraining structures often results in unreliable load cell behavior and, therefore, in undesirable variations in the output of the strain gauges used in conjunction with them. And, although efforts have been made to correct or compensate for these load cell fastening structures, such compensation has been found difficult to maintain over periods of continued scale use due to physical changes in the fastening structures themselves. The load cell retaining structure of this invention provides a means for reducing the effects of this longstanding problem in the portable scale art.

Despite the need for a truly portable, low profile, sturdy and accurate wheel scale device which overcomes the problems associated with these prior art weghing scales, none in so far as is known, has been proposed or developed. Accordingly, it is the object of this invention to provide a lightweight, fully electronic, self contained, high capacity wheel load scale which has a low profile for easy use and which utilizes a load cell assembly and cooperating load cell retaining structure and housing assembly that provides for the accurate and repeatable weighing of axle loads, for example, under a wide range of environmental conditions.

SUMMARY OF THE INVENTION

This invention provides a portable wheel scale assembly which comprises a lightweight, low profile housing structure having an interiorly disposed opening with a bottom surface. The housing structure has opposing parallel bearing surfaces therein and at least one load cell assembly with strain gauge means. The load cell assembly further has opposing bearing means for engaging bearing surfaces in the housing and it is constructed and arranged to directly receive a load force at a predetermined area.

A load cell retaining structure having vertically movable flexible members is provided for restraining the lateral movement of the load cell within the wheel scale housing and for placing a minimum pre-load force on the load cell. The load cell retaining structure is further constructed and arranged to have opposing rigid securement members with means to restrain the movement of the load cell bearings on the bearing surfaces within the scale housing. The wheel platform member of the scale assembly communicates with both the load cell assembly and the vertically movable flexible members of the load cell retaining structure and it further cooperates with the load cell assembly to form a structural component of the scale assembly.

Provided also by this invention are certain component configurations as well as materials of construction for these cooperating components. And, provided are methods of utilizing the cooperating elements of the scale assembly to achieve accurate and usable weighing results.

These and other benefits of this invention will become clear from the following description, by reference to the drawings.

BRIEF DESCRIPTION OF THE DRAWINGS

FIG. 3 is a lateral plan view of the double ended shear load cell assembly of the invention;

FIG. 4 is a lateral plan view of the bearing pin configuration used in the load cell assembly of the invention;

FIG. 5 is a top plan view of the load cell assembly shown in FIG. 3;

FIG. 6 is a cross sectional view of the wheel scale of the invention and which shows the interaction between the various elements of the device;

FIG. 7 is a lateral plan view of the load cell assembly under stress due to an applied force.

DESCRIPTION OF THE PREFERRED EMBODIMENTS

Figure 1:
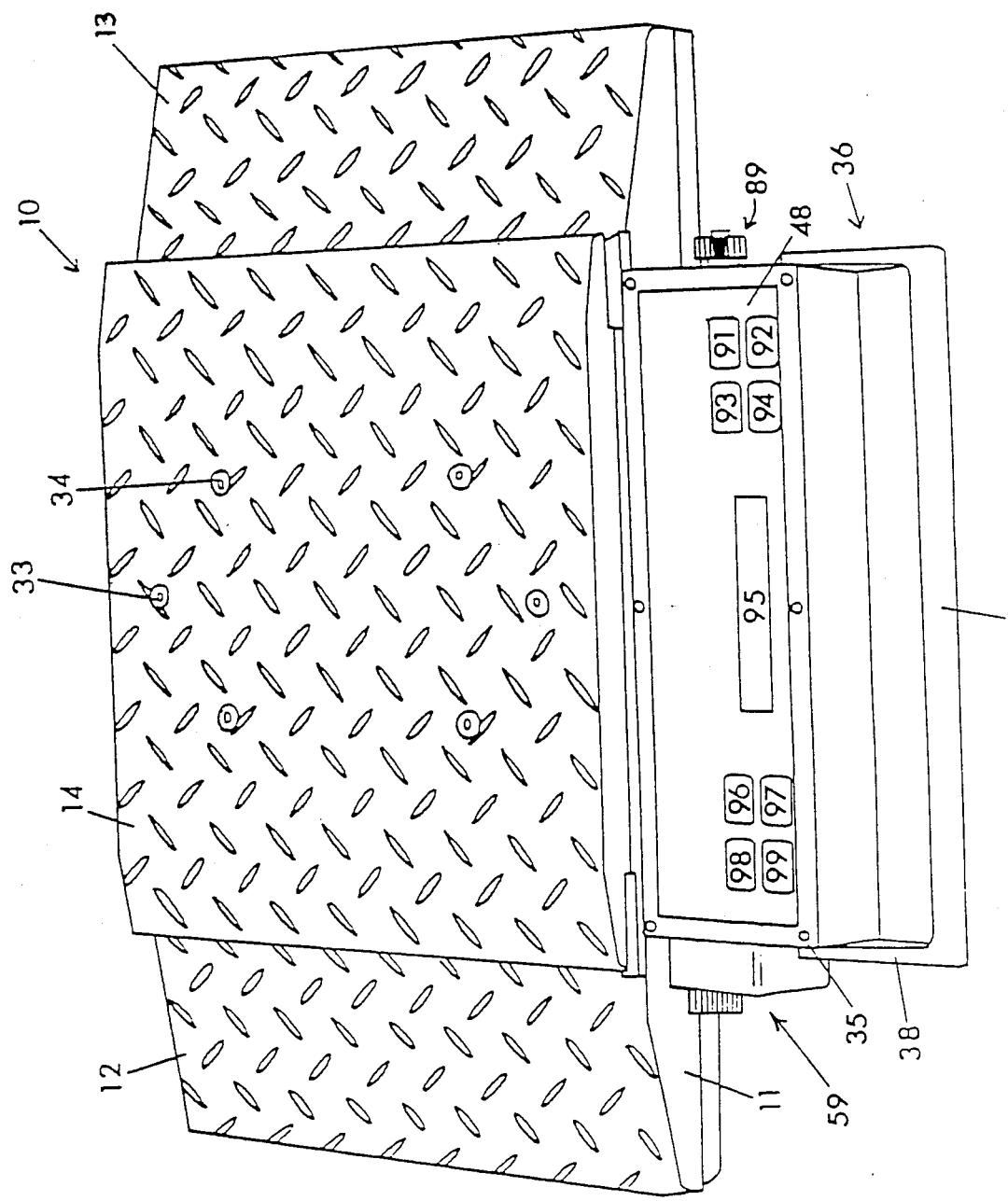
FIG. 1 is a perspective view of the portable electronic wheel scale of this invention.

Referring to FIG. 1, a wheel load scale 10 is shown having a housing structure 11 and integral and opposing ramp ends 12 and 13. On the top of wheel load scale 10 is the platform member 14 on which the wheel of a vehicle or other load is placed for weighing purposes.

The ramp ends 12 and 13, as well as the platform member 14, are provided with anti-skid elements or protrusions on their respective exterior surfaces. These gripping elements are integrally provided in the casting process of these scale assembly members.

The wheel scale 10 according to the invention provides a lightweight, electronic, self contained, high capacity wheel load scale. For example, one such scale, constructed of a sturdy, aluminum body structure 11 has a capacity to weigh loads up to 20,000 lbs. with an accuracy of ±1%. However, the teachings of this invention are also applicable to scales having other weight capacities.

The portable wheel scale assembly 10 also has a low profile or height. A scale assembly having a height of 3 inches has been found suitable for use as a portable scale by law enforcement officers, for example.

The wheel load scale 10 additionally has a housing extension 35 integral with housing structure 11 in which the electronic components of the wheel load scale 10 are contained as described below. Fixed to housing extension 35 is handle structure 36 having handle member 37 and integral, opposing, handle braces 38.

Figure 2:
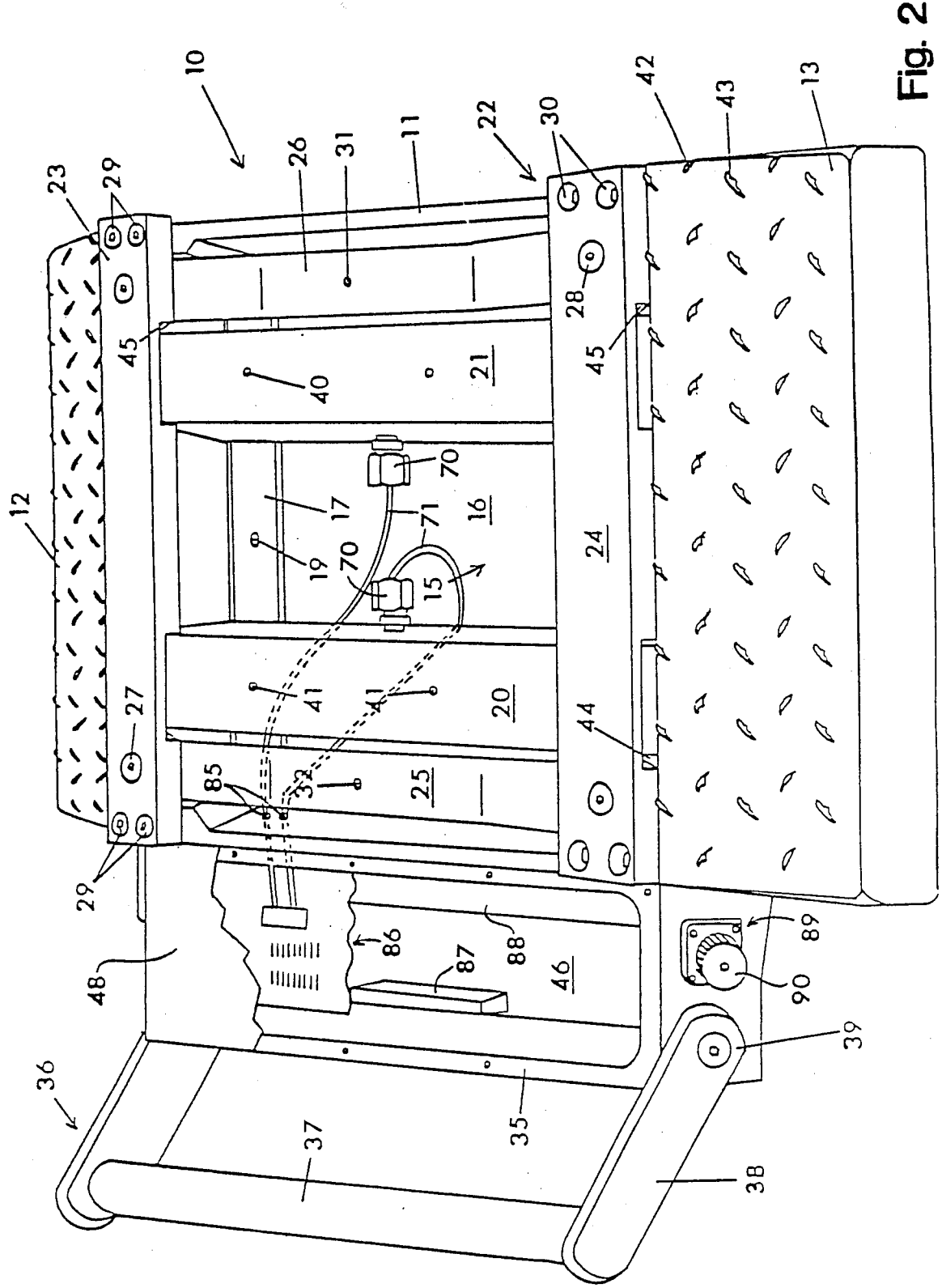
FIG. 2 is a perspective top view of the electronic wheel scale and which shows the interior opening in its housing wherein the bearing plates, load cells and the restraining structure are located.

FIG. 2 illustrates the interior elements of wheel load scale 10. As shown, the housing structure 11 has an interior opening 15 with a flat bottom surface 16. Fixed to the flat bottom 16 are opposing flat bearings 17 and 18 (see FIG. 6), by means of screws 19 and adhesive. A pair of load cell assemblies 20 and 21 ride on the flat bearings 17 and 18, as will be further discussed below.

FIG. 2 further shows the interior of the housing extension 35 wherein the electronic elements 86 and power source of the scale assembly are located. The cable assemblies 71 extend from the electrical connectors 70 that are mounted to the respective load cell assemblies 20 and 21. The cable assemblies 71 extend through apertures 85 in the end wall of housing 11 and into the housing extension 35.

The electronic components 86 consist of a circuit board assembly including an amplifier, a filter, an analog to digital converter, a microprocessor, a memory and a display. The various components are mounted within the opening 46 on shock absorbing mounting elements 87. The electronic components are powered by a battery pack 88, which consists, for example, of six 1.2 volt ni-cad batteries which are rechargeable at the external connector 89 having a connector cap 90. The battery pack 88 is insertable into the housing extension 35 at the battery port with protective cap assembly 59 located at the side of the housing extension 35.

The external connector 89 also is designed for cable connection to communicate with other scale assemblies 10, as will be discussed with respect to the operation of the scale assembly 10.

As shown in FIG. 1, the scale assembly has a face plate 48 which has a number of pressure sensitive switches as well as a display 95. The switch 91 is the scale "on" switch, which when activated will cause the scale to test all of the segments on the display and then zero itself. Switch 92 is the scale "off" switch. The switch 93 is the print switch which when activated transmits data via a connecting cable to another scale, printer or display. Switch 94 activates the weight unit selector to read pounds or kilograms. The switch 96 is for "local/total", which permits a user to display either the weight on the specific scale used (local) or to sum total weight from a plurality of scales (total). The switch 97 is the test switch that tests the display 95 function by activating all of its segments. The switch 98 is the lamp switch whicl will activate a light located behind the display 95 for night use. The switch 99 is the hold/release switch that permits the scale to be in a "hold mode" where the scale locks onto the first steady weight of 50 lbs. or greater. When released, the scale display 95 will indicate actual weights.

Importantly, a load cell retaining structure 22 is provided to laterally restrain the movement of load cells 20 and 21. The retaining structure 22 is comprised of rigid securement members 23 and 24, and vertically flexible members 25 and 26 which are connected by fastening screws 27 and 28. The rigid securement members 23 and 24 are fixed to housing structure 11 by means of fastening screws 29 and 30.

As is further shown, the rigid securement members 23 and 24 have slots 44 and 45 to allow the lateral alignment of load cells 20 and 21. This vertically clearing slot arrangement restricts any large vertical movements of the load cells within the housing structure 11. This is particularly important during transport and use of the wheel scales.

Referring to FIGS. 1 and 6, the platform 14 is fixed to load cells 20 and 21 by means of screws 34 into threaded apertures 40 and 41. Additionally, platform 14 is attached to the vertically flexible members 25 and 26 by means of screws 33 which extend through the platform 14 and to the threaded apertures 31 and 32 of the vertically flexible members 25 and 26, respectively, as shown in FIG. 2. This flexible member 25 and 26 arrangement restricts the lateral motion of the load cells with respect to the housing structure 11.

As is particularly shown in FIGS. 2 and 6, the flexible members 25 and 26 which are preferably constructed of stainless steel, have a downwardly extending or bent central portion, so that upon fastening to the platform member 14 by means of screws 33, a biasing force is placed on the platform 14 and thus, upon the load cells 20 and 21 that are directly attached thereto. This biasing force produced by the vertically flexible members 25 and 26 produce a proper setting or seating of the bearing pins 49 and 50 with respect to the bearing surfaces 17 and 18. This initial seating arrangement of the bearings caused by the biasing force is particularly helpful in scale accuracy at lower load ranges. The retaining and biasing means of this invention can also be utilized to restrain the movement of and to bias other types of load cell configurations, i.e., hydraulic or other types of strain gauge load cells.

FIGS. 3 and 5 respectively show side and top views of the load cell assembly 20. The rectangular load cell 20 is shown to have a slot 47 in its bottom surface at its opposite ends for receiving a bearing pin 50. Importantly, the bearing pin 50, as shown in FIG. 4, has a cross sectional body structure having a rounded or arched bottom portion 55.

The load cell 20 additionally is shown to have circular apertures 51 and 52 in which the strain gauges 60 are mounted. As is particularly illustrated in FIGS. 3, 5 and 6, the apertures 51 and 52, for example, are vertically centered and located towards the ends of the load cell 20. They are also spaced a predetermined distance from each other and from the outwardly located bearing pins 49 and 50. Importantly, as shown in FIG. 5, axially aligned apertures 72 and 73 are opposite apertures 51 and 52 to define a pair of web portions or sections 83 and 84 located axially and centrally along the longitudinal axis of the load cell 20. Each web section 83 has parallel end walls 57 and 58 to which, spacially and directionally, oppositely aligned strain gauges 60 are mounted.

Extending from and between apertures 51 and 52 and through the body structure of load cell 20 are interiorly disposed channels 53 and 54 through which the lead wires 63 are run, which extend from and electrically communicate with the strain gauges 60. The lead wires 63 ultimately extend to aperture 56, wherein a connecting post assembly 68 is located. The connecting assembly 68 has a circular plate or donut type disc 69 having terminals to which the lead wires 63 are connected. The connecting assembly 68 has a hollow rod or base member which extends through the aperture 56 to a connector assembly 70, from which a cable assembly 71 extends through the interior opening 15 to the housing extension 35 wherein the electronic components are located. Thus, all four strain gauges 60 are electrically connected to the circular plate 69 of the connecting post assembly 68. And, because the strain gauges 60, lead wires 63, and the connecting post assembly 68 are located in interiorly disposed apertures and channels, these sensitive electrical components can be readily packed or sealed with a filling compound 66, as shown with reference to FIG. 7, to protect these components from environmental elements, such as water and moisture.

Figure 8:
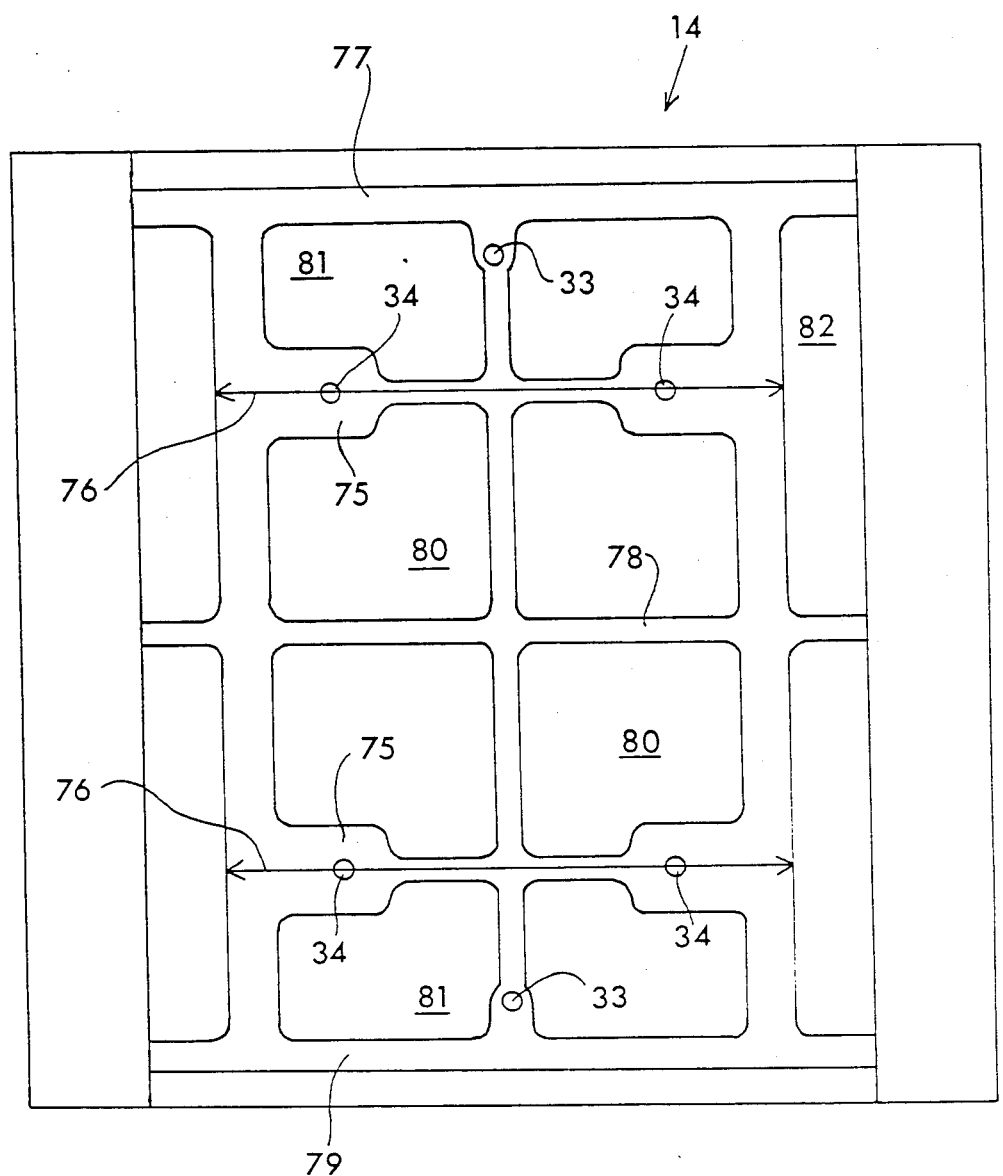
FIG. 8 is a bottom plan view of the wheel platform member utilized in the scale assembly of this invention and which particularly shows its bottom surface sections which cooperate with other elements of the wheel scale.

As further shown, threaded apertures 41 are located in the top of load cell 20 so that the platform 14 can be directly mounted thereto by means of screws 34, as shown in FIG. 6. Importantly, as is shown in FIGS. 6 and 8, the wheel platform 14 is constructed and arranged with respect to the load cell 20 so that the distributed load is imparted centrally to the load cell 20 between the circular apertures 51 and 52. FIG. 8 shows the bottom configuration of the platform 14 having indented sections or portions 80, 81 and 82 which further reduce the weight of the cast aluminum platform member 14 and which define the load transfer portions 75 as well as the raised outer structural portions 77 and 79 and the raised central structural portion 78. The load transfer portions 75 extend in alignment with the apertures for the fastening bolts 34 and each have a length 76 which is equal to the distance between the apertures 51 and 52 of the load cell 20. Thus, this direct or unitary load transfer configuration between the platform member 14 and the load cell 20 results in a defined shearing section located centrally on the load cell body between the apertures 51 and 52 wherein the strain gauges 60 are mounted. This load transfer configuration imparts the maximum stresses on the centrally aligned web portions 83 and 84 so that accurate and reproduceable results are obtained from the strain gauges 60 mounted thereto.

Additionally, it is important that this configuration between the platform member 14 and the load cells 20 and 21 yields a structurally cooperating arrangement whereby the loads placed on the wheel scale 10 are supported by the wheel platform 14 and the load cells 20 and 21. This cooperating structural arrangement yields a lightweight, portable scale 10 which could otherwise not be realized if each of the individual components, i.e., the platform 14, were required to support the anticipated maximum load.

Strain gauges are typically instrumental devices used to measure dimensional changes within or on the surface of a specimen, such as a load cell. The electrical-resistance strain gauge is a commonly used device for strain measurement. Its operation is based on the principle that the electrical resistance of a conductor changes when subjected to a mechanical deformation, i.e., due to weight on a load cell.

The electrical conductor is bonded to the load cell with an insulating cement under no-load conditions. A subsequent load, therefore, produces a deformation in both the load cell and in the strain gauge resistance element.

Although a number of resistance strain gauge types are known, i.e., wire gauge, foil gauge and semi-conductor gauge, the bonded strain gauge is shown used in the load cell of this invention. The bonded strain gauge, as is known in the art, consists of lead wires and active resistance wires which are mounted on a carrier sheet. To obtain maximum performance, the active resistance wires are mounted or cemented as near as possible to the gauging surface of the load cell.

Thus, when the active wire is stretched elastically, its strength and diameter are altered and which results in a change in its electrical resistance. The measurement of this resistance change is the principle of operation of the gauge in accordance with Poisson's ratio, crystal dislocation and elongation.

FIG. 6 illustrates a cross sectional view through housing structure 11 and which shows the operational placement of load cell 20 therein. As shown, the flat bearings 17 and 18 are mounted to the bottom surface 16 of housing structure 11. The bearing pins 49 and 50 of load cell 20 function on the bearing surfaces 17 and 18 when a load is placed on the load cell beam 20. Importantly, the slot 44 in rigid securement member 23 restrains the large vertical movement of load cell 20 with respect to housing structure 11. The slot 44 thus permits the small free vertical movement and shear deformation of load cell 20 which is required for the proper operation of load cell 20. Thus as a force F is placed on platform 14, the force F is transferred directly to the load cell 20 because the platform 14 is directly fastened to the top of load cell 20. As the force F is exerted on load cell 20, its beam body is able to be disfigured as bearing pins 49 and 50 move on flat bearings 17 and 18. This disfiguration causes the apertures 51 and 52 to be proportionally changed in configuration and therefore also the strain gauges that are securely mounted therein. Importantly, the configuration of load cell 20 having the bearing pins 49 and 50 disposed at its ends and having the platform 14 mounted directly thereto permits the proper deflection of load cell 20 irrespective of the exact location of force F relative to the top of platform 14.

Although the bearing means referred to with respect to the load cell assemblies have been horizontally mounted pins having rounded bottom portions, other bearing means could also be utilized in the invention. For example, oppositely mounted truncated bearings having an elliptoidal surface could also be mounted at each end of the load cell for cooperation with the planar bearing means at the bottom surface 16 of the housing opening 15.

FIG. 7 shows the load cell assembly 20 under a load F causing a deflection in the beam body as shown by dotted line 64. This load deflection causes the aperture 30 to assume an elliptical configuration 65, indicating a corresponding stress on the web portion 83 and, thus, on the strain gauge 60. The strain gauge 60 is shown mounted at an angle "x" with respect to the longitudinal axis "y" of the load cell beam. The angular configuration, as shown, causes the strain gauge 60 to undergo elongation. Because the strain gauge 60 mounted on the opposite side of the web is mounted perpendicularly, is placed in a state of compression. It has been found that opposing and oppositely mounted strain gauges yield accurate and reproducable electrical responses as a result of this configuration and its cooperation with the remaining elements of the scale assembly.

As many changes are possible to the embodiments of this invention, utilizing the teachings thereof, the descriptions above, and the accompanying drawings should be interpreted in the illustrative, and not in the limited sense.

That which is claimed is:

1. A portable electronic wheel scale comprising:
   a. a thin, lightweight housing structure having opposing ramp ends and an interiorly disposed opening having a bottom surface,
   b. opposing bearing surfaces fixed to said bottom surface,
   c. at least one load cell having at least one strain gauge in communication therewith, said load cell having a rectilinear body structure and having opposing bearing means extending downward at its ends for engaging said bearing surfaces,
   d. a load cell retaining structure fixed to said housing structure, said retaining structure having opposing vertically movable and lateral movement restricting elongated flexible members, and
   e. a platform member fastened to said load cell and to said vertically movable flexible and lateral movement restricting members of said load cell retaining structure.

2. The portable electronic wheel scale of claim 1, wherein said bearing surfaces are constructed of a hardened and smooth metallic material.

3. The portable electronic wheel scale of claim 1, wherein said opposing bearing means are load bearing pins having a hardened and smooth metallic finish and wherein said pins have a rounded bottom portion.

4. The portable electronic wheel scale of claim 1, wherein said load cell is a double ended shear load cell.

5. The portable electronic wheel scale of claim 1, wherein said housing structure additionally has a second housing structure laterally extending therefrom between and perpendicularly from said opposing ramp ends.

6. The portable electronic wheel scale of claim 5, wherein said second housing structure has an interior opening in communication with said interior opening of said housing base structure for containing electronic components in communication with said load cells and having a flexible display cover having a read out indicator and switch controls therein, said second housing structure further having an upwardly extending handle member.

7. The portable electronic wheel scale of claim 1, wherein a handle member structure is attached to said housing structure.

8. The portable electronic wheel scale of claim 1, wherein said housing structure and said platform member are constructed of cast aluminum.

9. The portable electronic wheel scale of claim 1, wherein said load cell retaining structure is constructed and arranged to have opposing rigid securement members having an upwardly extending slot therein for restraining the large vertical movement of said load cell bearing pins on said bearing surfaces, said opposing rigid members further being fastened to said opposing vertically flexible members.

10. The portable electronic wheel scale of claim 9, wherein said opposing rigid securement members are constructed of aluminum and wherein said vertically flexible members are constructed of stainless steel strips.

11. The portable electronic wheel scale of claim 1, wherein said load cell retaining means is bolted to said housing base structure and wherein said platform member is bolted to said load cell and to said retaining means.

12. A weighing scale assembly comprising:
   a. a housing base structure and an interiorly disposed opening having a bottom surface,
   b. opposing parallel planar bearing surfaces on said base structure bottom surface,
   c. at least one load cell having strain gauge means and having opposing bearing means extending downward therefrom for engaging said bearing surfaces,
   d. a load cell retaining structure for laterally restraining the movement of said load cell and having vertically movable flexible members, and
   e. a platform member fastened to said load cell and to said vertically movable flexible members of said load cell retaining structure.

13. The weighing scale assembly of claim 12, wherein said load cell retaining structure is constructed and arranged to have opposing rigid securement members having an upwardly extending slot therein for restraining the large vertical movement of said load cell bearing means on said bearing surfaces, said opposing rigid members further being fastened to said opposing vertically flexible members.

14. The weighing scale assembly of claim 12, wherein said load bearing means are bearing pins which have a hardened and smooth metallic finish and wherein said pins have a rounded bottom portion, and wherein said bearing surfaces are constructed of a hardened and smooth metallic material.

15. The weighing scale assembly of claim 12, wherein said load cell is a double ended shear load cell.

16. The weighing scale assembly of claim 12, wherein said opposing rigid securement members are constructed of aluminum and wherein said vertically flexible members are constructed of stainless steel strips.

17. The weighing scale assembly of claim 12, wherein said load cell retaining means is bolted to said housing base structure and wherein said platform member is bolted to said load cell and to said retaining means.

18. A portable wheel scale assembly comprising:
   a. a lightweight housing structure having a low profile and an interiorly disposed opening at its top,
   b. bearing means mounted in said housing opening,
   c. at least one load cell assembly having strain gauge means in communication therewith, said load cell assembly further having a rectilinear beam structure having bearing means for engaging said housing bearing means,
   d. a load cell retaining and preloading structure having biasing means for maintaining a minimum force on said load cell assembly and for aligning said load cell bearing means with said housing bearing means, and
   e. a platform member in communication with said load cell assembly structure and to said biasing means of said load cell retaining and preloading structure, said load cell assembly and said platform member further being constructed and arranged to cooperate in forming a structural component of said wheel scale assembly.

19. The portable wheel scale assembly of claim 18 wherein a pair of double ended shear load cells are utilized in a spacially parallel configuration on said opposing bearing means in said housing opening and wherein said load cell retaining and preloading structure is comprised of opposing biasing means and wherein said platform member is directly mounted to each said double ended shear web load cell and to each said opposing biasing means.

20. A portable wheel scale assembly comprising:
   a. a lightweight housing structure having a low profile and an interiorly disposed opening at its top,
   b. bearing means mounted in said housing opening,
   c. at least one load cell assembly having strain gauge means in communication therewith,
   d. a load cell retaining and preloading structure having biasing means for maintaining a minimum force on said load cell assembly and for aligning said load cell bearing means with said housing bearing means, and
   e. a platform member in communication with said load cell assembly structure and to said biasing means of said load cell retaining and preloading structure.

* * * * *